US008335985B2

(12) United States Patent
Kakehi

(10) Patent No.: US 8,335,985 B2
(45) Date of Patent: Dec. 18, 2012

(54) DOCUMENT USE MANAGING SYSTEM, DOCUMENT PROCESSING APPARATUS, MANIPULATION AUTHORITY MANAGING APPARATUS, DOCUMENT MANAGING APPARATUS AND COMPUTER READABLE MEDIUM

(75) Inventor: Rumiko Kakehi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 210 days.

(21) Appl. No.: 12/784,565

(22) Filed: May 21, 2010

(65) Prior Publication Data

US 2011/0145702 A1  Jun. 16, 2011

(30) Foreign Application Priority Data

Dec. 16, 2009  (JP) ................................ 2009-285499

(51) Int. Cl.
  *G06F 17/00* (2006.01)
  *G06F 21/00* (2006.01)
(52) U.S. Cl. .......... 715/255; 715/202; 715/256; 705/51; 705/54; 705/57
(58) Field of Classification Search .................. 715/255, 715/202, 256; 726/1; 705/51, 54, 57
See application file for complete search history.

(56) References Cited

U.S. PATENT DOCUMENTS

| 6,529,911 B1 * | 3/2003 | Mielenhausen ........................ 1/1 |
| 7,085,741 B2 * | 8/2006 | Lao et al. ........................ 705/51 |
| 7,913,309 B2 * | 3/2011 | Starostin et al. ................. 726/26 |
| 2004/0236697 A1 | 11/2004 | Nagao et al. |
| 2004/0268254 A1 * | 12/2004 | Fujiwara ........................ 715/530 |
| 2005/0097166 A1 * | 5/2005 | Patrick et al. ................. 709/203 |
| 2006/0282402 A1 * | 12/2006 | Takahashi ........................ 707/1 |
| 2008/0066147 A1 * | 3/2008 | Dillaway et al. .................. 726/1 |
| 2008/0282318 A1 * | 11/2008 | Rits ................................. 726/1 |
| 2009/0185223 A1 * | 7/2009 | Kanai et al. .................. 358/1.15 |
| 2009/0249070 A1 * | 10/2009 | Abendroth et al. ........... 713/170 |
| 2009/0327137 A1 * | 12/2009 | Raley et al. ..................... 705/54 |

FOREIGN PATENT DOCUMENTS

| JP | 2000-194591 A | 7/2000 |
| JP | 2004-348286 A | 12/2004 |
| JP | 2009-026229 A | 2/2009 |

* cited by examiner

*Primary Examiner* — Chau Nguyen

(74) *Attorney, Agent, or Firm* — Sughrue Mion, PLLC

(57) ABSTRACT

In response to an instruction to copy data from a first electronic document to a second electronic document, a protected document generating section of a document processing apparatus newly generates a third electronic document as a copying result. A combining requesting section requests combining of pieces of manipulation authority information (policies) to be applied to the first and second electronic documents, respectively. In response to the request, a policy combining section of a policy managing apparatus combines the two pieces of manipulation authority information together into third manipulation authority information. A protected document registering section registers the third electronic document and the third manipulation authority information in a document DB.

10 Claims, 13 Drawing Sheets

FIG. 2

| DOCUMENT ID | POLICY ID | DOCUMENT FILE |
|---|---|---|
| A | 0001 | .... |
| B | 0002 | .... |
| C | 0003 | .... |
| D | 0004 | .... |
| E | 0005 | .... |
| F | 0007 | .... |
| G | 0008 | .... |
| H | 0009 | .... |
| ⋮ | ⋮ | ⋮ |

FIG. 3

| POLICY ID | EXPIRY DATE | ELIGIBLE USER | RIGHTS |
|---|---|---|---|
| 0001 | 2010/12/31 | AAA | VIEWING, PRINTING, DATA COPYING |
| | | BBB | VIEWING |
| | | CCC | VIEWING, PRINTING |
| 0002 | INDEFINITE | AAA | VIEWING, EDITING, PRINTING |
| | | BBB | VIEWING, EDITING, PRINTING |
| | | EEE | VIEWING, EDITING, PRINTING |
| ... | ... | ... | ... |

FIG. 6

| COMBINING RULE ID | EXPIRY DATE | ELIGIBLE USERS | RIGHTS |
|---|---|---|---|
| 1 | COPYING BETWEEN DOCUMENTS TO WHICH DIFFERENT POLICIES ARE TO BE APPLIED IS PROHIBITED | | |
| 2 | 2010/3/31 | COMMON USERS | VIEWING |
| 3 | EARLIER EXPIRY DATE | COMMON USERS | COMMON RIGHTS |
| 4 | EXPIRY DATE OF POLICY TO BE APPLIED TO COPYING DESTINATION DOCUMENT | USER WHO COMMANDS DATA COPYING | COMMON RIGHTS |
| | | OWNER OF COPYING DESTINATION DOCUMENT | ALL RIGHTS |
| | | OWNER OF COPYING SOURCE DOCUMENT | VIEWING |
| 5 | 10 DAYS AFTER GENERATION | USER WHO COMMANDS DATA COPYING | VIEWING, EDITING |
| | | OWNER OF COPYING DESTINATION DOCUMENT | VIEWING, EDITING |
| ... | ... | ... | ... |

FIG. 7

| POLICY ID | EXPIRY DATE | ELIGIBLE USER | RIGHTS | COMBINING RULE ID |
|---|---|---|---|---|
| ... | ... | ... | ... | ... |
| 0004 | 2010/12/31 | AAA | VIEWING, PRINTING, DATA COPYING | 2 |
| | | BBB | VIEWING | — |
| | | CCC | VIEWING, PRINTING | — |
| 0005 | INDEFINITE | AAA | VIEWING, EDITING, PRINTING | — |
| | | BBB | VIEWING, EDITING, PRINTING | — |
| | | EEE | VIEWING, EDITING, PRINTING | — |
| ... | ... | ... | ... | ... |

| POLICY ID | EXPIRY DATE | ELIGIBLE USER | RIGHTS | COMBINING RULE ID |
|---|---|---|---|---|
| ... | ... | ... | ... | ... |
| 0004 | 2010/12/31 | AAA | VIEWING, PRINTING, DATA COPYING | 2 |
|  |  | BBB | VIEWING | - |
|  |  | CCC | VIEWING, PRINTING | - |
| 0005 | INDEFINITE | AAA | VIEWING, EDITING, PRINTING | - |
|  |  | BBB | VIEWING, EDITING, PRINTING | - |
|  |  | EEE | VIEWING, EDITING, PRINTING | - |
| ... | ... | ... | ... | ... |
| 0101 | 2010/3/31 | AAA | VIEWING | - |
|  |  | BBB | VIEWING | - |

FIG. 10

| POLICY ID | SECURITY LEVEL | EXPIRY DATE | ELIGIBLE USER | RIGHTS | COMBINING RULE ID |
|---|---|---|---|---|---|
| ... | ... | ... | ... | ... | ... |
| 0007 | 5 | 10 DAYS AFTER GENERATION | AAA | VIEWING | — |
| | | | DDD | VIEWING | — |
| 0008 | 4 | 2010/12/31 | AAA | VIEWING, EDITING, PRINTING | 4 |
| | | | BBB | VIEWING, EDITING | — |
| | | | CCC | VIEWING, PRINTING | — |
| 0009 | 3 | INDEFINITE | AAA | VIEWING, EDITING, PRINTING | 2 |
| | | | BBB | VIEWING, EDITING, PRINTING | — |
| | | | EEE | VIEWING, EDITING, PRINTING | 5 |
| ... | ... | ... | ... | ... | ... |

FIG. 11

| COMBINING RULE ID | SECURITY LEVEL | EXPIRY DATE | ELIGIBLE USERS | RIGHTS |
|---|---|---|---|---|
| 1 | 5 | EARLIER EXPIRY DATE | USER WHO COMMANDS DATA COPYING | VIEWING |
| 2 | LOW SECURITY LEVEL | 2010/3/31 | COMMON USERS | VIEWING |
| 3 | HIGH SECURITY LEVEL | EARLIER EXPIRY DATE | COMMON USERS | COMMON RIGHTS |
| 4 | HIGH SECURITY LEVEL | EXPIRY DATE OF POLICY HAVING HIGHER SECURITY LEVEL | USERS OF POLICY HAVING HIGHER SECURITY LEVEL | VIEWING, PRINTING |
| 5 | HIGH SECURITY LEVEL | EXPIRY DATE OF POLICY HAVING HIGHER SECURITY LEVEL | USERS OF POLICY HAVING HIGHER SECURITY LEVEL | RIGHTS OF POLICY HAVING HIGHER SECURITY LEVEL |
| ... | ... | ... | ... | ... |

FIG. 12

| POLICY ID | SECURITY LEVEL | EXPIRY DATE | ELIGIBLE USER | RIGHTS | COMBINING RULE ID |
|---|---|---|---|---|---|
| ... | ... | ... | ... | ... | ... |
| 0007 | 5 | 10 DAYS AFTER GENERATION | AAA | VIEWING | — |
|  |  |  | DDD | VIEWING | — |
| 0008 | 4 | 2010/12/31 | AAA | VIEWING, EDITING, PRINTING | 4 |
|  |  |  | BBB | VIEWING, EDITING | — |
|  |  |  | CCC | VIEWING, PRINTING | — |
| 0009 | 3 | INDEFINITE | AAA | VIEWING, EDITING, PRINTING | 2 |
|  |  |  | BBB | VIEWING, EDITING, PRINTING | — |
|  |  |  | EEE | VIEWING, EDITING, PRINTING | 5 |
| ... | ... | ... | ... | ... | ... |
| 0102 | 4 | 2010/12/31 | AAA | VIEWING, PRINTING | — |
|  |  |  | BBB | VIEWING, PRINTING | — |
|  |  |  | CCC | VIEWING, PRINTING | — |

DOCUMENT USE MANAGING SYSTEM, DOCUMENT PROCESSING APPARATUS, MANIPULATION AUTHORITY MANAGING APPARATUS, DOCUMENT MANAGING APPARATUS AND COMPUTER READABLE MEDIUM

CROSS-REFERENCE TO RELATED APPLICATIONS

This application is based on and claims priority under 35 USC 119 from Japanese Patent Application No. 2009-285499 filed on Dec. 16, 2009.

BACKGROUND

1. Technical Field

The present invention relates to a document use managing system, a document processing system, a manipulation authority managing apparatus, a document managing apparatus, and a computer readable medium.

2. Related Art

To protect an electronic document from illegal use, a procedure is available that information that prescribes manipulation authority of a user or a user group (hereinafter referred to generically as a user) over the electronic document is generated in advance and the use of the electronic document is controlled according to that information. The information that prescribes manipulation authority is called access control information (or list), a security policy, or the like (hereinafter referred to generically as a security policy). Systems are known which intensively manage security policies with a server on a network. In systems of this kind, security policies are correlated with respective electronic documents. When a user requests a manipulation on an electronic document, whether to permit the user the manipulation is judged on the basis of the security policy corresponding to the electronic document.

Assume that in a system of the above kind a security policy (referred to as a first policy) that is correlated with a certain electronic document (referred to as a first document) gives a certain user a data copying right for the contents of the first document. In this case, the user can copy a portion of the first document into a second document which is protected by another security policy (referred to as a second policy). If this is done, that portion of the first document which has been copied into the second document is protected according to the second policy but may not be protected in the manner prescribed by the first policy.

SUMMARY

According to an aspect of the invention, a document use managing system includes: a document processing apparatus; and a manipulation authority managing apparatus. The document processing apparatus includes: an instruction receiving section that receives an instruction to copy data from a first electronic document which is correlated with first manipulation authority information to a second electronic document which is correlated with second manipulation authority information; a new document generating section that newly generates a third electronic document which is a result of copying of the data from the first electronic document to the second electronic document in response to the instruction received by the instruction receiving section; a combining requesting section that requests the manipulation authority managing apparatus to generate third manipulation authority information by combining the first manipulation authority information and the second manipulation authority information together; and a registration requesting section that requests the manipulation authority managing apparatus to register the third electronic document generated by the new document generating section. And, the manipulation authority managing apparatus includes: a storage section that stores electronic documents and corresponding relationships between the electronic documents and pieces of manipulation authority information which indicate manipulation authorities of users or user groups over the associated electronic documents; a new manipulation authority information generating section that newly generates the third manipulation authority information by combining the first manipulation authority information and the second manipulation authority information together in response to the request from the combining requesting section of the document processing apparatus; and a registering section that registers, in the storage section, a corresponding relationship indicating that the third manipulation authority information corresponds to the third electronic document in response to the request from the registration requesting section of the document processing apparatus.

BRIEF DESCRIPTION OF THE DRAWINGS

Exemplary embodiment(s) of the present invention will be described in detail based on the following figures, wherein:

FIG. 2 shows example data contents of a document DB;

FIG. 3 shows example data contents of a policy DB;

FIG. 6 shows an example list of plural combining rules;

FIG. 7 shows example data contents of a policy DB;

FIG. 10 shows example data contents of a policy DB;

FIG. 11 shows an example list of plural combining rules;

FIG. 12 shows example data contents of the policy DB after policy combining that is performed in association with data copying.

DETAILED DESCRIPTION

Figure 1:
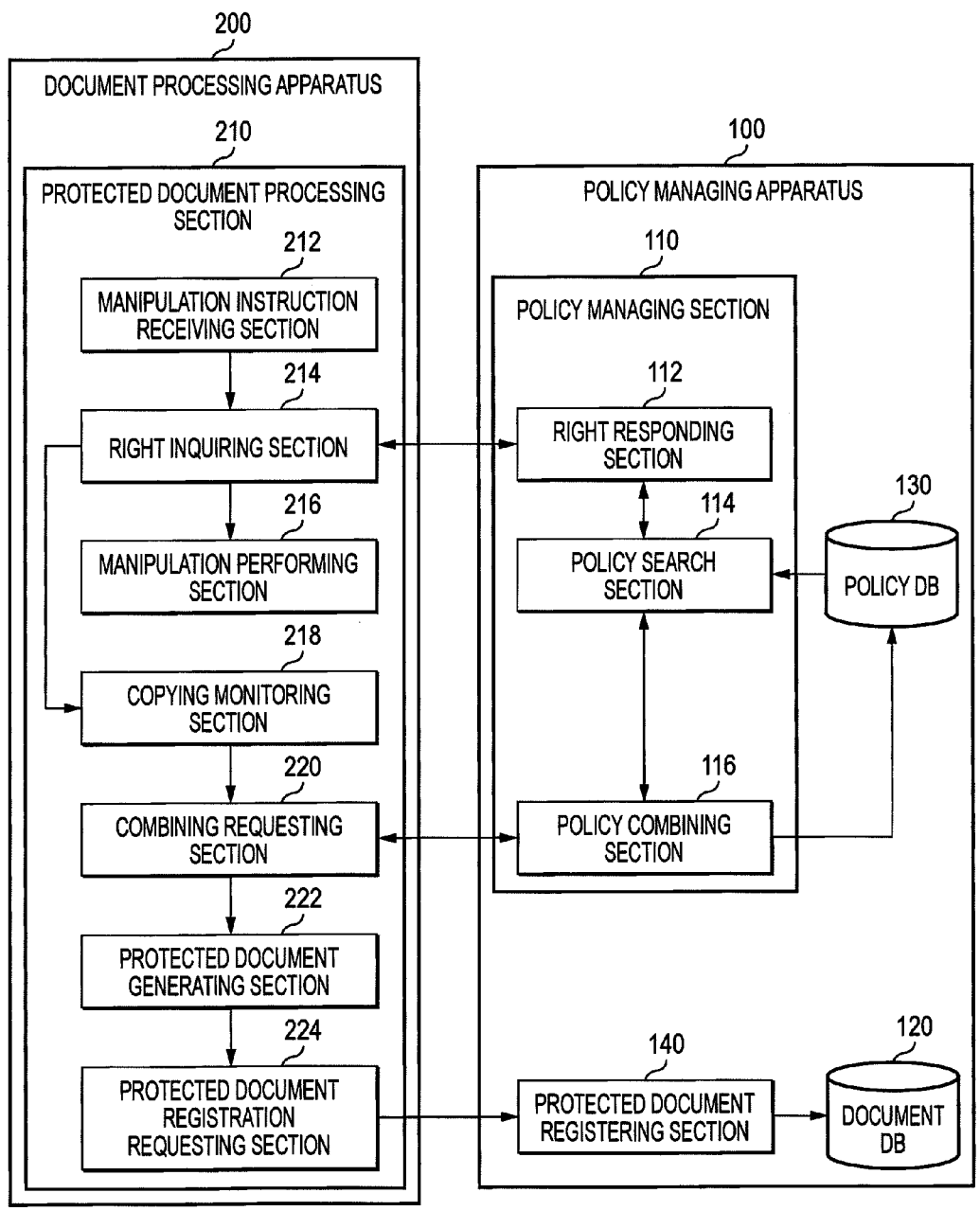
FIG. 1 shows an example document use managing system according to an exemplary embodiment.

FIG. 1 shows an example document use managing system according to an exemplary embodiment. This system includes a policy managing apparatus 100 and a document processing apparatus 200 which can communicate with each other over a data communication network such as a LAN (local area network) or the Internet.

The policy managing apparatus 100 is a server for performing control or management of the security (information protection) of management subject electronic documents. The term "electronic document" means electronic data that expresses a document in a predetermined data format. For example, the electronic document may be such as to have content data that represents the contents of the electronic document and attribute data that represents attributes of the electronic document. When the electronic document is printed or displayed on a screen, an image representing the content data is drawn on a medium (sheet or screen). The attribute data includes identification information (hereinafter referred to as a document ID) that is assigned to the electronic document uniquely at least in the system. The attribute data may also include such information as a document name, a date of production, a date of update, and an owner name (e.g., the name of a person who produced the document). The attribute data may also include policy information that represents a security policy to be applied to the electronic document or identification information (hereinafter referred to as a policy ID) for identification of the security policy.

More specifically, in this system, the electronic documents managed by the policy managing apparatus 100 are assigned respective security policies. The security policy is information that describes what manipulations each user is permitted for the associated electronic document, and can be called manipulation authority information, for example. From the opposite point of view, it can be said that the security policy is information indicating what restrictions each user receives in manipulating the electronic document. Therefore, the security policy can also be called manipulation restriction information. Manipulations on an electronic document include viewing, editing, printing, data copying, fax transmission, etc.

In this specification, the term "user" is not limited to a single user and includes a group consisting of plural users. When a user requests a certain manipulation on a certain electronic document, the policy managing apparatus 100 judges whether or not the user is allowed to perform the manipulation on the electronic document by referring to the security policy that is assigned to the electronic document. The request is accepted only if the user is allowed to do so.

To perform such a control, the policy managing apparatus 100 has a document database (DB) 120 and a policy DB 130.

The document DB 120 is a database for storing information indicating what security policies are assigned (to be applied) to respective management subject electronic documents. FIG. 2 shows example data contents of the document DB 120. In this example, for each management subject electronic document, a document ID, a policy ID which is identification information of a security policy to be applied to it, and a document file which is a data file of itself are registered in the document DB 120. It is not always necessary that a document file of each electronic document be registered in the document DB 120; such information as link information indicating a document file that is stored in another location may be registered instead. The document DB 120 may be provided in either the policy managing apparatus 100 as in the example of FIG. 2 or another computer capable of communicating with the policy managing apparatus 100 over a network. A security policy may be assigned to an electronic document by a known method by, for example, a person who produced or manages it.

The policy DB 130 stores one or more records representing respective security policies (hereinafter referred to simply as policies) used in the system. FIG. 3 shows example data contents of the policy DB 130. In this example, the record of each policy includes a policy ID which is identification information of the policy and an expiry date of the policy. After a lapse of the expiry date of a policy, the use of the electronic document is restricted according to a predetermined handling rule of policy-expired documents (e.g., all manipulations are disabled). For each eligible user (or user group) who is allowed to perform certain manipulations on an electronic document to which a policy is to be applied, information indicating rights given to the user (e.g., a list of permitted kinds of manipulation authority) is included in the record of the policy. For example, for the electronic document to which the policy having a policy ID "0001" (shown at the top of the example of FIG. 3) is to be applied, the user having a user ID "AAA" has rights of viewing, printing, and data copying. What group each user belongs to is managed by a directory server or a personnel information server (not shown), and the policy managing apparatus 100 refers to information managed by that server. The manipulation "data copying" is a manipulation of copying all or a specified portion of the content data of a copying source electronic document to a specified location in the content data of a copying destination electronic document.

Registering a policy in the policy DB 130 or editing a policy stored therein is performed by, for example, a manager of the policy managing apparatus 100.

A policy managing section 110 provides a user with information indicating manipulation authority of the user over an electronic document by referring the policy DB 130. This information may be either license information indicating authority of the user (including a list of permitted kinds of manipulation authority and their expiry date) that is determined from the policy to be applied to the electronic document or information indicating whether a specific manipulation (e.g., printing) requested by the user is permitted or not. In the example of FIG. 1, the policy managing section 110 provides information of the latter kind, for example. A right responding section 112 of the policy managing section 110 is in charge of processing of providing such information. When receiving, from the document processing apparatus 200, an inquiry containing the identification information (user ID) of a user who requests a manipulation, the document ID of a manipulation subject electronic document, and information indicating a type of the manipulation requested by the user, the right responding section 112 causes a policy search section 114 to search for the policy corresponding to the electronic document. The policy search section 114 finds, in the document DB 120, the policy ID corresponding to the document ID of the electronic document contained in the inquiry, reads the policy record corresponding to the thus-found policy ID from the policy DB 130, and gives it to the right responding section 112. The right responding section 112 finds, in the received policy record, the manipulation authority list corresponding to the user ID contained in the inquiry. If the manipulation type contained in the inquiry is included in the list, the right responding section 112 returns, to the document processing apparatus 200, reply information to the effect that the manipulation is permitted. If the manipulation type is not included in the list, the right responding section 112 returns, to the document processing apparatus 200, reply information to the effect that the manipulation is not permitted. The processing performed by the right responding section 112 and the policy search section 114 may be the same as conventional policy-based user manipulation authority judging processing, and is not limited to the above-described processing.

A policy combining section 116 performs policy combining processing when data copying is performed from a certain electronic document to another electronic document. In this exemplary embodiment, when a data copying instruction is made, a new electronic document is generated as a result of the data copying and a composite policy obtained by combining the respective policies to be applied to a copying source electronic document and a copying destination electronic document is applied to the new document. The policy combining section 116 generates such a composite policy.

A protected document registering section 140 registers the new electronic document generated in response to the data copying instruction in the document DB 120 in such a manner that it is correlated with the composite policy. As a result, the registered new document is protected by the composite policy.

The document processing apparatus 200 is an apparatus for manipulating an electronic document according to an instruction of a user. For example, the document processing apparatus 200 may be a personal computer (hereinafter abbreviated as PC) of each user or a server that provides a document managing service for users who manipulate PCs. Although only one document processing apparatus 200 is shown in FIG. 1, the system may include plural document processing apparatus 200.

The document processing apparatus 200 is equipped with a protected document processing section 210 for processing an electronic document that is managed by the policy managing apparatus 100 so as to be correlated with a policy (such a document will be referred to as a protected document). For example, when a user instructs the document processing apparatus 200 to manipulate the file of a protected document, the protected document processing section 210 is activated, which then opens the file of the protected document and controls the manipulation on the file.

In the protected document processing section 210, a manipulation instruction receiving section 212 receives a manipulation instruction for a protected document from a user. Where the document processing apparatus 200 is a PC of the user, the manipulation instruction receiving section 212 acquires, from the operating system, a manipulation instruction that is indicated by an input from an input device (mouse, keyboard, or the like) of the PC. Where the document processing apparatus 200 is a document processing server, the manipulation instruction receiving section 212 receives data of a manipulation instruction from a client PC over a network.

A right inquiring section 214 inquires of the policy managing apparatus 100 whether or not the manipulation of the instruction made by the user is permitted by the associated policy. To make this inquiry, the right inquiring section 214 sends the policy managing apparatus 100 an inquiry containing the user ID of the user, the document ID of the manipulation subject electronic document, and information indicating the type of the manipulation. Before receiving the manipulation instruction from the user, the document processing apparatus 200 authenticates the user and recognizes the user ID. The transmitted inquiry is processed by the right responding section 112 of the policy managing apparatus 100 in the above-described manner. The right inquiring section 214 receives a reply indicating a processing result (i.e., whether the manipulation is permitted or not) from the right responding section 112. If the reply indicates that the manipulation is not permitted, the right inquiring section 214 does not cause execution of the manipulation and communicates, to the user, a notice to the effect that the manipulation is not permitted. If the reply indicates that the manipulation is permitted, the right inquiring section 214 instructs a manipulation performing section 216 to perform the manipulation. When receiving the instruction to perform the manipulation from the right inquiring section 214, the manipulation performing section 216 performs the manipulation commanded by the user on the electronic document. For example, if the manipulation of the instruction is printing, the right inquiring section 214 sends the electronic document to a printer (not shown) and causes the printer to print the electronic document. If the manipulation of the instruction is editing, the right inquiring section 214 causes alterations specified by the user to the electronic document.

If the manipulation commanded by the user is data copying from a first electronic document to a second electronic document, in a conventional apparatus, data in a portion specified by the user of the first electronic document is inserted into the second electronic document at a specified position. In contrast, different processing is performed in the exemplary embodiment. For data copying manipulation, the protected document processing section 210 is equipped with a copying monitoring section 218, a combining requesting section 220, a protected document generating section 222, and a protected document registration requesting section 224. If the manipulation commanded by the user is data copying and the data copying manipulation is permitted as a result of inquiring of the policy managing apparatus 100, the right inquiring section 214 instructs the copying monitoring section 218 to perform processing for data copying instead of causing the manipulation performing section 216 to perform conventional copying processing.

When instructed by the right inquiring section 214 to perform data copying from the first electronic document (copying source) to the second electronic document (copying destination), the copying monitoring section 218 instructs the combining requesting section 220 to combine together the policies to be applied to the two respective electronic documents. When so instructed, the combining requesting section 220 sends, to the policy combining section 116 of the policy managing apparatus 100, a combining request that contains the document IDs of the first and second electronic documents.

When receiving the combining request, the policy combining section 116 finds, in the document DB 120, the policy IDs corresponding to the document IDs contained in the combining request of the first and second electronic documents and acquires, from the policy DB 130, the records of the policies (hereinafter referred to as a first policy and a second policy) corresponding to the respective policy IDs. The policy combining section 116 generates a new policy (third policy) by combining the contents (expiry dates, eligible users, rights, and other items) of the two acquired policies and registers it in the policy DB 130 by giving it a unique policy ID.

Figure 4:
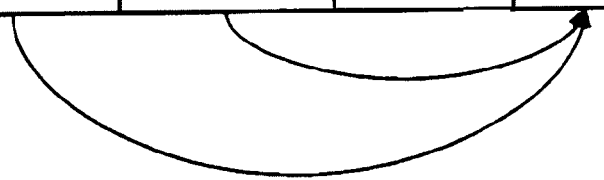
FIG. 4 shows example data contents of the policy DB after policy combining that is performed in association with data copying.

In one example, the first policy and the second policy are combined together by selecting common portions of the two policies on an item-by-item basis. For example, assume that the document DB 120 and the policy DB 130 have the contents shown in FIGS. 2 and 3, respectively, and user AAA has made an instruction to copy data that is a portion of document A into document B. In this case, the policy combining section 116 combines together policies 0001 and 0002 corresponding to the respective documents A and B. Since the expiry dates of the policies 0001 and 0002 are "2010/12/31" and "indefinite," the common portion of the two expiry dates is "2010/12/31." The common portion of the two sets of eligible users is users AAA and BBB. The common portion of two sets of rights is determined for each eligible user. That is, for user AAA, the common portion of the two sets of rights is viewing and printing. For user BBB, the common portion of the two sets of rights is viewing. Policy 0100 is generated as shown in FIG. 4 by selecting common portions on an item-by-item basis and is registered in the policy DB 130.

After registering the composite policy in the above-described manner, the policy combining section 116 returns its policy ID to the combining requesting section 220 of the document processing apparatus 200.

Although in the above description the combining requesting section 220 sends the policy combining section 116 a combining request that contains the document IDs of the first and second electronic documents, this is just an example. If the files of the electronic documents held by the document processing apparatus 200 contain the policy IDs of the policies to be applied to them, a combining request that is sent by the combining requesting section 220 may contain the policy IDs instead of the document IDs of the first and second electronic documents.

When receiving the ID of the composite policy in the above-described manner, the combining requesting section 220 instructs the protected document generating section 222 to generate a new protected document (third electronic document) which is a result of the specified data copying. The term "result of the data copying" as used herein means content data that is generated by inserting that portion of the first electronic document which is specified as the copying subject into the second electronic document at the position that is specified as the copying destination. That is, in the exemplary embodiment, instead of copying the copying subject portion of the first electronic document into the second document, the new third electronic document which is different from both of the first electronic document and the second electronic document and represents a result of the copying. A document ID of the third electronic document may be acquired from the policy managing apparatus 100 or generated by the protected document processing section 210 according to a predetermined rule.

When the third electronic document has been generated in the above-described manner, the protected document processing section 210 displays the third electronic document on the screen as the copying result in place of the second electronic document (copying destination) that has been displayed so far. As a result, the user sees, on the screen, a result of copying of the specified portion of the first electronic document into the second electronic document.

The protected document registration requesting section 224 sends, to the protected document registering section 140 of the policy managing apparatus 100, a registration request containing the thus-generated third electronic document and the policy ID that has been acquired from the policy combining section 116 by the combining requesting section 220.

When receiving the registration request, the protected document registering section 140 registers, in the document DB 120, the file of the third electronic document contained in the registration request and correspondence information indicating that the third electronic document corresponds to the policy ID contained in the registration request (i.e., the ID of the composite policy). The composite policy which corresponds to the third electronic document thus reflects not only the policy to be applied to the second electronic document (copying destination) but also the policy to be applied to the first electronic document (copying source). In particular, in this example, since common portions of the policies of two respective electronic documents are employed, only sets of manipulations corresponding to respective users and permitted for a copying source electronic document are eligible. That is, a user who is not allowed to manipulate a copying source electronic document cannot manipulate a third electronic document as a copying result. And a manipulation of such a kind as not to be permitted for a copying source electronic document cannot be performed on the third electronic document.

Each of the electronic documents registered in the document DB 120 is supplied to the document processing apparatus 200 in response to a request.

Figure 5:
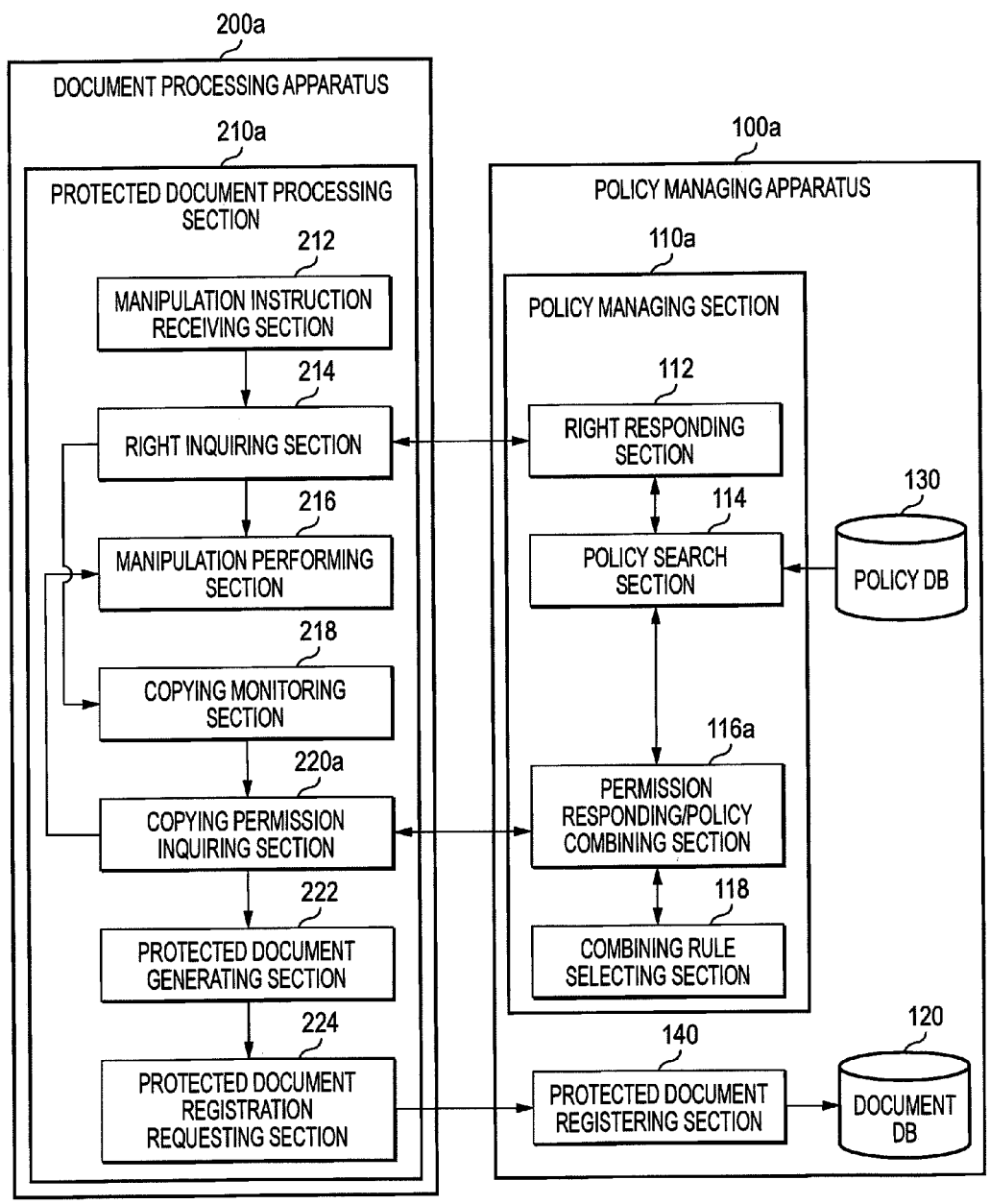
FIG. 5 shows an example document use managing system according to a first modification.

Next, a first modification will be described. FIG. 5 shows an example configuration of a document use managing system according to this modification. Sections, units, etc. in FIG. 5 having the same or similar ones in FIG. 1 are given the same reference numerals as the latter and will not be described in detail.

In the above-described exemplary embodiment, two policies are combined together by selecting common portions of their contents. In contrast, in the first modification, plural methods are introduced for the combining of policies and it is made possible to specify one of those methods for each policy. Each policy combining method will be hereinafter referred to as a combining rule. A combining rule selecting section 118 of the policy managing apparatus 100a is stored with plural combining rules and one of them that corresponds to a policy concerned is selected.

FIG. 6 shows an example list of plural combining rules stored in the combining rule selecting section 118. Five combining rules are shown in the list so as to be correlated with respective pieces of identification information (combining rule IDs).

Combining rule 1, which is the most strict rule, is a rule that data copying is prohibited if the policies to be applied to a copying source electronic document and a copying destination electronic document are different from each other. That is, if the policies to be applied to a copying source electronic document and a copying destination electronic document are different from each other, the data copying commanded by a user is not performed and policy combining is not performed either.

Combining rule 2 is a rule that a composite policy of a copying source electronic document and a copying destination electronic document is generated in such a manner that the expiry date is a fixed date "2010/3/31," the eligible users are common users of the sets of eligible users of the two policies, and the right is only "viewing."

Combining rule 3 is a rule that common portions of the policies of a copying source electronic document and a copying destination electronic document are employed in a composite policy on an item-by-item basis. Combining rule 3 is the same as the manner of combining used in the above exemplary embodiment.

Combining rule 4 is a rule that the expiry date of a composite policy is the same as that of the policy to be applied to a copying destination electronic document (second electronic document (mentioned above)) and the eligible users are a user who commands a data copying manipulation, the owner of the copying destination electronic document, and the owner of a copying source electronic document (first electronic document (mentioned above)). In the composite policy, rights are set for each eligible user. More specifically, the user who commands the data copying manipulation is permitted common ones of the rights (manipulation authority) that are given to that user in the policies of the copying source electronic document and the copying destination electronic document. The owner of the copying destination electronic document is given all rights, and the owner of the copying source electronic document is given only the viewing right. In this example, the owner of the copying destination electronic document is given the right to give another user the right to manipulate a third electronic document as a copying result. This is similar to making the owner of the copying destination electronic document the owner of a third electronic document (copying result).

Combining rule 5 is a rule that the date that is 10 days after a generation date of a third electronic document as a copying result (i.e., a date of execution of copying manipulation) is employed as the expiry date of a composite policy, the eligible users are a user who commands a data copying manipulation, the owner of a copying destination electronic document, and each of them is given the viewing and editing rights. This rule is used for, for example, allowing the owner of a copying destination electronic document and a user who did data copying to edit a copying result document jointly.

In the first modification, as illustrated in FIG. 7, the record of each policy stored in the policy DB 130 has a space for the ID of the combining rule to be applied to the policy. The policy DB 130 may be configured so that a combining rule to be applied can be designated for each policy. However, in this example, the policy DB 130 is configured so that a combining rule to be applied can be designated for each eligible user in a policy. In the illustrated example, combining rule 2 is designated for eligible user AAA of policy 0004.

Returning to FIG. 5, the document processing apparatus 200a is equipped with a copying permission inquiring section 220a in place of the combining requesting section 220 of the exemplary embodiment. When receiving an instruction to copy data from a first electronic document to a second electronic document from the copying monitoring section 218, the copying permission inquiring section 220a sends the policy managing apparatus 100a an inquiry that contains the IDs of those documents and a user ID.

The policy managing apparatus 100a is equipped with a permission responding/policy combining section 116a in place of the policy combining section 116 of the exemplary embodiment. When receiving the inquiry from the copying permission inquiring section 220a, the permission responding/policy combining section 116a finds, in the document DB 120, the policy IDs corresponding to the document IDs of the first and second electronic documents contained in the inquiry, respectively, and acquires the policies corresponding to the respective policy IDs from the policy DB 130. The permission responding/policy combining section 116a reads out the combining rule ID corresponding to the policy that corresponds to the copying source electronic document (one of the two acquired policies), and causes a combining rule selecting section 118 to select the combining rule having the read-out combining rule ID. If the selected combining rule prohibits data copying (e.g., the case of combining rule 1 shown in FIG. 6), the permission responding/policy combining section 116a sends the copying permission inquiring section 220a an answer to the effect that copying is prohibited. In this case, the copying permission inquiring section 220a prevents the protected document generating section 222 from generating a third electronic document as a copying result and communicates a copying prohibition notice to the user.

If the selected combining rule permits data copying (e.g., the cases of combining rules 2-5 shown in FIG. 6), the permission responding/policy combining section 116a sends the copying permission inquiring section 220a an answer to the effect that copying is permitted. In response, the copying permission inquiring section 220a causes the protected document generating section 222 to generate a third electronic document as a copying result. In this case, the permission responding/policy combining section 116a composes a policy to be applied to the third electronic document according to the selected combining rule, registers the composite policy in the policy DB 130, and informs the copying permission inquiring section 220a of an ID that has been given to the composite policy.

Figure 8:
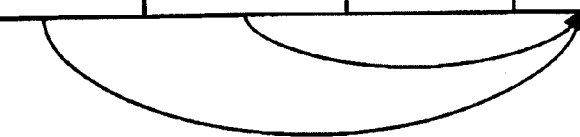
FIG. 8 shows example data contents of the policy DB after policy combining that is performed in association with data copying.

Assume that, for example, the document DB 120 and the policy DB 130 have the contents shown in FIGS. 2 and 7, respectively, and user AAA has made an instruction to copy data of a portion of document D into document E. In this case, the permission responding/policy combining section 116a combines together policy 0004 corresponding to document D and policy 0005 corresponding to document E. Since combining rule 2 is designated for eligible user AAA in policy 0004 which corresponds to the copying source document D, policies 0004 and 0005 are combined together according to combining rule 2 shown in FIG. 6. Therefore, the expiry date of a resulting composite policy is "2010/3/31," the eligible users are users AAA and BBB who are common to the two policies, the right given to each eligible user is only "viewing" which is fixed in combining rule 2. FIG. 8 shows example contents of the policy DB 130 which include composite policy 0101 thus composed.

In the first modification, if a copying source electronic document and a copying destination electronic document are associated with the same policy, ordinary data copying (i.e., edit processing of adding copying subject data of the copying source electronic document to the contents of the copying destination electronic document) may be performed instead of generating a new electronic document representing a copying result. In this case, when finding that the copying source electronic document and the copying destination electronic document are associated with the same policy, the permission responding/policy combining section 116a sends an answer to that effect to the copying permission inquiring section 220a. When receiving that answer, the copying permission inquiring section 220a instructs the manipulation performing section 216 to perform ordinary data copying processing. This processing which is performed when a copying source electronic document and a copying destination electronic document are associated with the same policy may also be applied to the exemplary embodiment.

In the above-described first modification, the combining rule that is set for the policy corresponding to a copying source electronic document is employed. Instead, the combining rule that is set for the policy corresponding to a copying destination electronic document may be employed. As a further alternative, one of the combining rules that are set for the policies corresponding to a copying source electronic document and a copying destination electronic document may be selected. In this case, if a combining rule is set for the policy corresponding to only one of the copying source electronic document and the copying destination electronic document, that combining rule is selected. If a combining rule is set for each of the policies corresponding to the copying source electronic document and the copying destination electronic document, one of them is selected according to a predetermined rule. An example method for this selection will be described in a second modification described below.

No combining rule is set for either of the policies corresponding to the copying source electronic document and the copying destination electronic document, a predetermined default rule (e.g., combining rule 3) may be employed.

Figure 9:
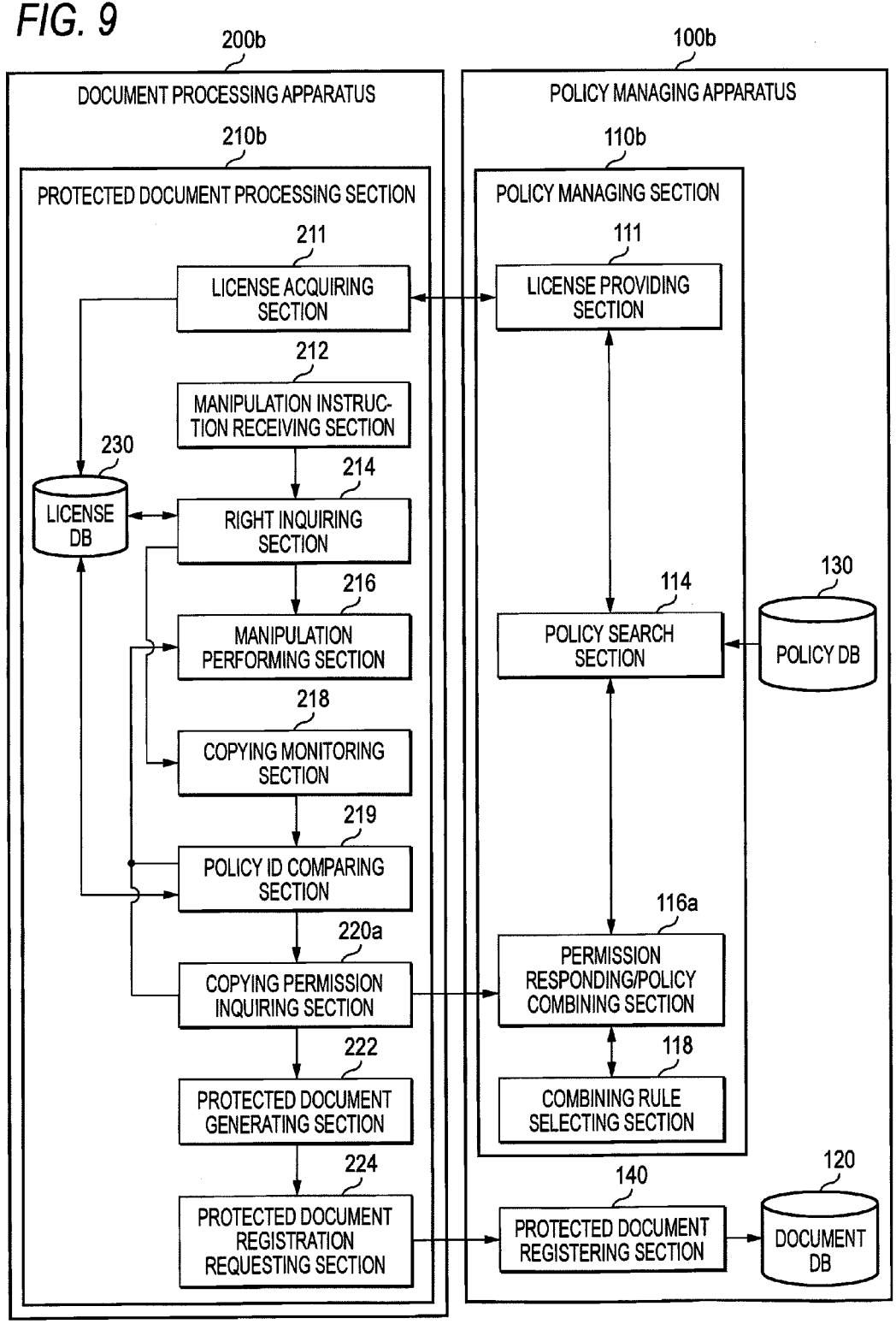
FIG. 9 shows an example document use managing system according to a second modification.

Next, a second modification will be described. FIG. 9 shows an example configuration of a document use managing system according to this modification. Sections, units, etc. in FIG. 9 having the same or similar ones in FIG. 1 or 5 are given the same reference numerals as the latter and will not be described in detail.

In the above-described exemplary embodiment and first modification, every time a user instructs the protected document processing section 210 or 210a to make a manipulation on an electronic document, the protected document processing section 210 or 210a inquires of the policy managing apparatus 100 or 100a whether the manipulation is possible or not. Instead, in the second modification, the policy managing apparatus 100b supplies the protected document processing section 210b in advance with license data containing information of rights (manipulation authority) that user is permitted for the electronic document. The license data may such as to contain the entire contents (expiry date, sets of rights of all eligible users, and other information) of the record of the policy corresponding to the electronic document or contain only that portion of the record of the policy which relates to the user who has requested a license. The license data contains the document ID of the subject electronic document or the ID of the policy on which the license data is based, or both.

When a user instructs a license acquiring section 211 of the protected document processing section 210b to acquire a license, the license acquiring section 211 requests a license providing section 111 of the policy managing apparatus 100b to provide a license. In response to the request, the license providing section 111 generates license data on the basis of data stored in the policy DB 130 and supplies it to the license acquiring section 211.

A user may specify a subject electronic document and request license data corresponding to the electronic document. In this case, the document ID of the electronic document is sent to the license providing section 111. The license providing section 111 finds the policy corresponding to the document ID and generates license data on the basis of the thus-found policy. In this case, a procedure is possible that the ID of the user is sent to the license providing section 111 and the license providing section 111 provides license data on the basis of only that portion of the policy which relates to the user.

A still another procedure is possible that the license acquiring section 211 sends the license providing section 111 the ID of a user who has requested license data and the license providing section 111 provides license data of all policies that give rights (manipulation authority) to the user.

The license data thus acquired by the license acquiring section 211 is stored in a license DB 230 of the document processing apparatus 200b.

When an instruction to make a manipulation on an electronic document is received from the user, the right inquiring section 214 inquires of the license DB 230 instead of the policy managing apparatus 100b whether the manipulation should be permitted or not. If license data corresponding to the manipulation subject electronic document exists in the license DB 230 and the license data contains the right to perform the manipulation, the manipulation is permitted.

Furthermore, in the second modification, when the copying monitoring section 218 detects that a user has made a data copying instruction, a policy ID comparing section 219 finds, in the license DB 230, the policy IDs corresponding to a copying source electronic document and a copying destination electronic document and compares those policy ID with each other. If they are identical, the policy ID comparing section 219 causes the manipulation performing section 216 to perform ordinary data copying (described above) from the copying source electronic document to the copying destination electronic document. On the other hand, if the two policy IDs are not identical, the copying permission inquiring section 220a inquires of the policy managing apparatus 100b whether to permit the copying by sending the two policy IDs and the user ID to it.

In response to the inquiry, the permission responding/policy combining section 116a of the policy managing apparatus 100b instructs the policy search section 114 to search the policy DB 130 for the records of the policies of the two policy IDs contained in the inquiry.

In the second modification, as shown in FIG. 10, a security level indicating the degree of security-related secrecy is set for each policy. In this example, security levels are expressed by positive integers (e.g., 1 to 5 (five levels)) and the level is higher when the value is larger.

In the second modification, the combining rule that is set for one, having a higher security level, of the two policies found by the policy search section 114 is employed.

For example, assume that the document DB 120 and the policy DB 130 have the contents shown in FIGS. 2 and 10, respectively, and user AAA has made an instruction to copy data that is a portion of document G into document H. In this case, the permission responding/policy combining section 116a combines together policies 0008 and 0009 corresponding to the respective documents G and H. As shown in FIG. 10, policy 0008 has a security level "4," which is higher than the security level of policy 0009. Therefore, in this case, combining rule 4 which is set for user AAA in policy 0008 having the higher security level is employed. The permission responding/policy combining section 116a combines policies 0008 and 0009 together according to combining rule 4.

If no combining rule is set for the user corresponding to the policy having the higher security level, a default combining rule may be employed even if a combining rule is set for the policy having the lower security level. For another example, if no combining rule is set for the user corresponding to the policy having the higher security level, the combining rule that is set for the policy having the lower security level may be employed if it is set.

In the second modification, since policies are assigned respective security levels, a manner of combining security levels is prescribed in the combining rule corresponding to each policy. FIG. 11 shows an example list of combining rules used in the second modification. In this example, if combining rule 1 is used, a composite policy is given a fixed security level "5," the expiry date is an earlier one of the expiry dates of the policies corresponding to a copying source electronic document and a copying destination electronic document, and the eligible user is only the user who commands copying, and only the viewing right is given. If combining rule 2 is used, a composite policy is given a security level that is a lower one of the security levels of the policies corresponding to a copying source electronic document and a copying destination electronic document and the other items are set in the same manners as in the case of using combining rule 2 shown in FIG. 6. If combining rule 3 is used, a security level that is a higher one of the security levels of the policies corresponding to a copying source electronic document and a copying destination electronic document is employed and the other items are set in the same manners as in the case of using combining rule 3 shown in FIG. 6. If combining rule 4 is used, the security level, expiry date, and eligible users of a policy having a higher security level are employed and fixed rights "viewing" and "printing" are employed. If combining rule 5 is used, the entries of one, having a higher security level, of the policies corresponding to a copying source electronic document and a copying destination electronic document are employed for the respective items.

When policies 0008 and 0009 shown in FIG. 10 are combined together according to combining rule 4, composite policy 0102 shown in FIG. 12 is obtained as a combining result.

Although in the first and second modifications combining rules are set for respective eligible users in each policy, combining rules may be set for respective policies.

Figure 13:
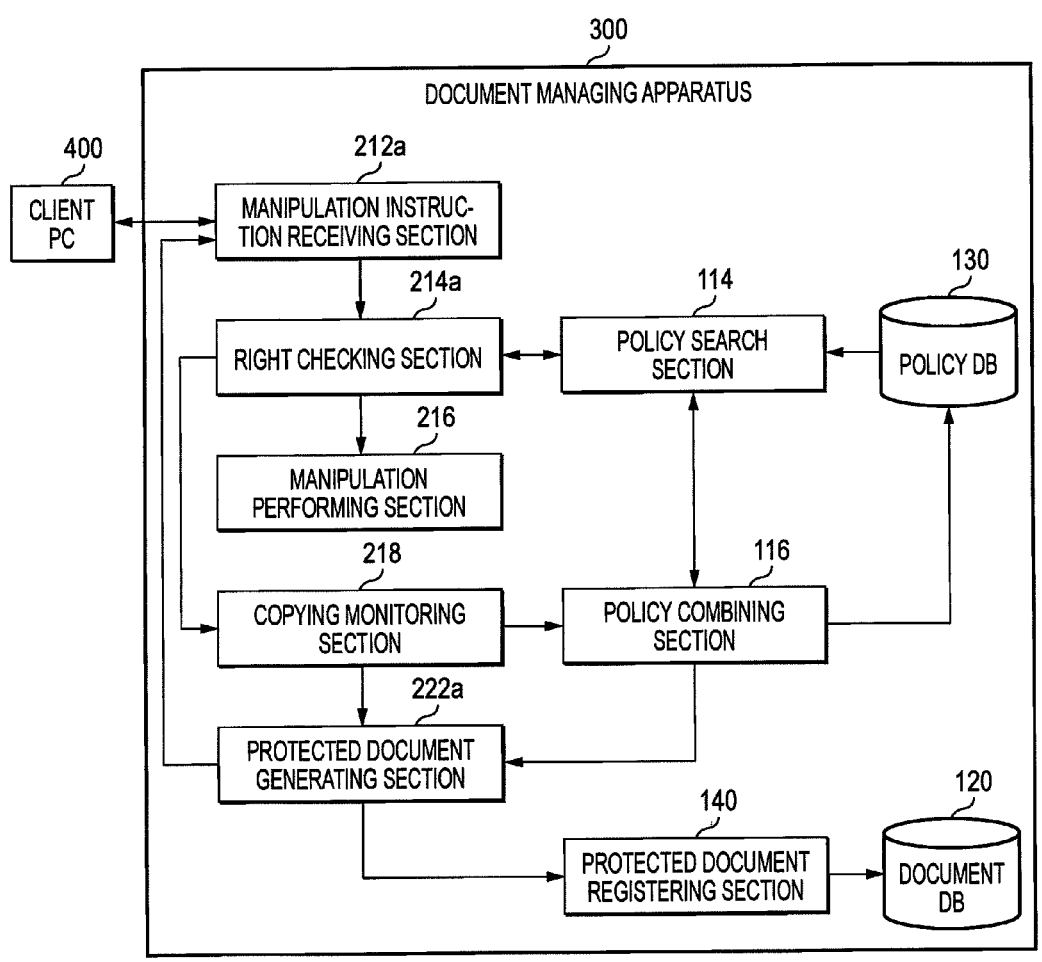
FIG. 13 shows an example document use managing system according to a third modification.

In the above-described exemplary embodiment and first and second modifications, the policy managing apparatus 100, 100a, or 100b and the document processing apparatus 200, 200a, or 200b are implemented on separate computers and operate by communicating with each other over a network or the like. Alternatively, it is naturally possible to implement them on the same computer. FIG. 13 shows such a type of implementation (third modification). Sections, units, etc. in FIG. 13 that perform the same or similar processing as corresponding ones in FIG. 1 are given the same reference numerals as the latter.

A document managing apparatus 300 shown in FIG. 13 is a server which provides a document management service and a policy management service for a client PC 400 with which the former can communicate over a network. Electronic documents (protected documents) to be used by the client PC 400 are registered in a document DB 120 of the document managing apparatus 300 and thus managed. When a user wants to open or manipulate a protected document, the user logs in the document managing apparatus 300 from the client PC 400 (also performs user authentication) and commands a manipulation by specifying a subject document. This instruction is received by a manipulation instruction receiving section 212a of the document managing apparatus 300. A right checking section 214a causes a policy search section 114 to search for the policy corresponding to the subject document, and checks, on the basis of the thus-found policy, whether or not the user has the right to perform the commanded manipulation on the subject document. If it is found that the user has that right, a manipulation performing section 216 performs the manipulation.

Even where it is found that the user has the above-mentioned right, if the commanded manipulation is data copying from a first electronic document (subject document) to a second electronic document, a copying monitoring section 218 detects that fact. In this case, the copying monitoring section 218 gives the IDs of the first electronic document and the second electronic document to a policy combining section 116 and requests it to combine policies together. Furthermore, the copying monitoring section 218 instructs a protected document generating section 222a to generate a new electronic document as a copying result. The protected document generating section 222a generates a new electronic document in which data of a copying subject portion of the first electronic document is inserted in the second electronic document at a copying destination position, registers the new document in the document DB 120 via a protected document registering section 140, and returns the new document (copying result) to the client PC 400 via the manipulation instruction receiving section 212a.

As described above, the third modification is the example in which the system of FIG. 1 according to the exemplary embodiment is implemented as the single apparatus. Each of the systems of FIGS. 5 and 9 according to the first and second modifications can likewise be implemented as a single apparatus.

For example, each of the above-described policy managing apparatus 100, document processing apparatus 200, and document managing apparatus 300 can be implemented by causing a general-purpose computer to run programs representing processes to be executed by the above-described individual function modules. For example, the computer has such a circuit configuration that hardware components such as a microprocessor such as a CPU, memories such as a random access memory (RAM) and a read-only memory (ROM), an HDD (hard disk drive) controller for controlling an HDD, various I/O (input/output) interfaces, and a network interface for performing a control for making a connection to a network such as a local area network are connected to each other via a bus. For example, a disc drive for reading and/or writing on a portable disc recording media such as a CD and a DVD, memory reader/writers for reading and/or writing on a portable nonvolatile recording media of various standards such as a flash memory, and other devices may be connected to the bus via the I/O interfaces. The programs that describe the processing contents of the above-described individual function modules are stored in a fixed storage device such as the HDD over a communication such as a network and thereby installed in the computer. The above-described function modules are realized when the programs stored in the fixed storage device are read into the RAM and run by the microprocessor such as a CPU. All or part of the function modules may be a hardware circuit such as a dedicated LSI (large scale integration), an ASIC (application-specific integrated circuit), or an FPGA (field programmable gate array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document use managing system comprising:
a document processing apparatus; and
a manipulation authority managing apparatus,
wherein the document processing apparatus comprises:
an instruction receiving section that receives an instruction to copy data from a first electronic document which is correlated with first manipulation authority information to a second electronic document which is correlated with second manipulation authority information;
a new document generating section that newly generates a third electronic document which is correlated with third manipulation authority information, and is a result of copying of the data from the first electronic document to the second electronic document in response to the instruction received by the instruction receiving section;
a combining requesting section that requests the manipulation authority managing apparatus to generate the third manipulation authority information by combining the first manipulation authority information and the second manipulation authority information together; and
a registration requesting section that requests the manipulation authority managing apparatus to register the third electronic document generated by the new document generating section, and
wherein the manipulation authority managing apparatus comprises:
a storage section that stores electronic documents and corresponding relationships between the electronic documents and pieces of manipulation authority information which indicate manipulation authorities of users or user groups over the associated electronic documents;
a new manipulation authority information generating section that newly generates the third manipulation authority information by combining the first manipulation authority information and the second manipulation authority information together in response to the request from the combining requesting section of the document processing apparatus; and a registering section that registers, in the storage section, a corresponding relationship indicating that the third manipulation authority information corresponds to the third electronic document in response to the request from the registration requesting section of the document processing apparatus, wherein at least one of the instruction receiving section, the new document generating section, the combining requesting section, the registration requesting section, the storage section, the new manipulation authority information generating section, and the registering section includes a hardware circuit.

2. The document use managing system according to claim 1, wherein the manipulation authority managing apparatus further comprises:

a combining rule storage section that stores combing rules correlated with the respective pieces of manipulation authority information, the combining rules to be employed in combining one piece of manipulation authority information with another piece of manipulation authority information, and wherein the new manipulation authority information generating section generates the third manipulation authority information by retrieving, in the combining rule storage section, a combining rule corresponding to the first manipulation authority information and combining the first manipulation authority information and the second manipulation authority information together in accordance with the retrieved combining rule.

3. The document use managing system according to claim 1, wherein the manipulation authority managing apparatus further comprises:

a combining rule storage section that stores (i) secrecy levels of the respective pieces of manipulation authority information and (ii) combing rules correlated with the respective pieces of manipulation authority information, the combining rules to be employed in combining one piece of manipulation authority information with another piece of manipulation authority information, and wherein the new manipulation authority information generating section generates the third manipulation authority information by (i) retrieving, in the combining rule storage section, a combining rule corresponding to one, having a higher secrecy level, of the first manipulation authority information and the second manipulation authority information, and (ii) combining the first manipulation authority information and the second manipulation authority information together in accordance with the retrieved combining rule.

4. The document use managing system according to claim 1, wherein the new manipulation authority information generating section generates the third manipulation authority information that gives a manipulation authority to a user or user group who has manipulation authorities of both of the first manipulation authority information and the second manipulation authority information.

5. A document processing apparatus communicating with a manipulation authority managing apparatus, comprising:

an instruction receiving section that receives an instruction to copy data from a first electronic document which is correlated with first manipulation authority information to a second electronic document which is correlated with second manipulation authority information;

a new document generating section that newly generates a third electronic document which is correlated with third manipulation authority information, and is a result of copying of the data from the first electronic document to the second electronic document in response to the instruction received by the instruction receiving section;

a combining requesting section that requests the manipulation authority managing apparatus to generate the third manipulation authority information by combining the first manipulation authority information and the second manipulation authority information together; and a registration requesting section that requests the manipulation authority managing apparatus to register the third electronic document generated by the new document generating section, wherein at least one of the instruction receiving section, the new document generating section, the combining requesting section, and the registration requesting section includes a hardware circuit.

6. A non-transitory computer readable medium storing a program causing a computer to execute a process for document processing, the process comprising:

receiving an instruction to copy data from a first electronic document which is correlated with first manipulation authority information to a second electronic document which is correlated with second manipulation authority information;

newly generating a third electronic document which is correlated with third manipulation authority information, and is a result of copying of the data from the first electronic document to the second electronic document in response to the received instruction;

requesting a manipulation authority managing apparatus to generate the third manipulation authority information by combining the first manipulation authority information and the second manipulation authority information together; and requesting the manipulation authority managing apparatus to register the generated third electronic document.

7. A manipulation authority managing apparatus communicating with a document processing apparatus, comprising:

a storage section that stores electronic documents and corresponding relationships between the electronic documents and pieces of manipulation authority information which indicate manipulation authorities of users or user groups over the associated electronic documents;

a new manipulation authority information generating section that (i) receives, from the document processing apparatus, a request for combining first manipulation authority information and second manipulation authority information together when the document processing apparatus receives an instruction to copy data from a first electronic document which is correlated with the first manipulation authority information to a second electronic document which is correlated with the second manipulation authority information, and (ii) newly generates third manipulation authority information by combining the first manipulation authority information and the second manipulation authority information together; and a registering section that (i) receives, from the document processing apparatus, a request for registering a third electronic document which is correlated with the third manipulation authority information and is a result of copying of the data from the first electronic document to the second electronic document and (ii) registers, in the storage section, a corresponding relationship indicating that the third manipulation authority information corresponds to the third electronic document, wherein at least one of the storage section, the new manipulation authority information generating section, and the registering section includes a hardware circuit.

8. A non-transitory computer readable medium storing a program causing a computer to execute a process for managing manipulation authorities, the process comprising:

storing electronic documents and corresponding relationships between the electronic documents and pieces of manipulation authority information which indicate manipulation authorities of users or user groups over the associated electronic documents;

receiving, from a document processing apparatus, a request for combining first manipulation authority information and second manipulation authority information together when the document processing apparatus receives an instruction to copy data from a first electronic document which is correlated with the first manipulation authority information to a second electronic document which is correlated with the second manipulation authority information;

newly generating third manipulation authority information by combining the first manipulation authority information and the second manipulation authority information together;

receiving, from the document processing apparatus, a request for registering third electronic document which is a result of copying of the data from the first electronic document to the second electronic document; and registering a corresponding relationship indicating that the third manipulation authority information corresponds to the third electronic document.

9. A document managing apparatus comprising:

a storage section that stores electronic documents and corresponding relationships between the electronic documents and pieces of manipulation authority information which indicate manipulation authorities of users or user groups over the associated electronic documents;

an instruction receiving section that receives an instruction to copy data from a first electronic document which is correlated with first manipulation authority information to a second electronic document which is correlated with second manipulation authority information;

a new document generating section that newly generates a third electronic document which is correlated with third manipulation authority information, and is a result of copying of the data from the first electronic document to the second electronic document in response to the instruction received by the instruction receiving section;

a new manipulation authority information generating section that newly generates the third manipulation authority information by combining the first manipulation authority information and the second manipulation authority information together in response to the instruction received by the instruction receiving section; and a registering section that registers, in the storage section, a corresponding relationship indicating that the third manipulation authority information corresponds to the third electronic document, wherein at least one of the instruction receiving section, the new document generating section, the storage section, the new manipulation authority information generating section, and the registering section includes a hardware circuit.

10. A non-transitory computer readable medium storing a program causing a computer to execute a process for managing electronic documents, the process comprising:

storing electronic documents and corresponding relationships between the electronic documents and pieces of manipulation authority information which indicate manipulation authorities of users or user groups over the associated electronic documents;

receiving an instruction to copy data from a first electronic document which is correlated with first manipulation authority information to a second electronic document which is correlated with second manipulation authority information;

newly generating a third electronic document which is correlated with third manipulation authority information, and is a result of copying of the data from the first electronic document to the second electronic document in response to the received instruction;

newly generating the third manipulation authority information by combining the first manipulation authority information and the second manipulation authority information together in response to the received instruction; and registering a corresponding relationship indicating that the third manipulation authority information corresponds to the third electronic document.

* * * * *